United States Patent
Jun et al.

(10) Patent No.: US 9,866,921 B2
(45) Date of Patent: *Jan. 9, 2018

(54) METHOD AND APPARATUS FOR TRANSMITTING VIDEO CONTENT COMPRESSED BY CODEC

(75) Inventors: Hae-young Jun, Seoul (KR); Sung-bum Park, Seongnam-si (KR); Dong-seek Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 765 days.

This patent is subject to a terminal disclaimer.

(21) Appl. No.: 13/030,590

(22) Filed: Feb. 18, 2011

(65) Prior Publication Data

US 2011/0206128 A1    Aug. 25, 2011

Related U.S. Application Data

(60) Provisional application No. 61/306,189, filed on Feb. 19, 2010.

(30) Foreign Application Priority Data

Oct. 4, 2010    (KR) ........................ 10-2010-0096516

(51) Int. Cl.
     *H04N 7/12*        (2006.01)
     *H04N 21/658*     (2011.01)
     (Continued)

(52) U.S. Cl.
     CPC ..... *H04N 21/6582* (2013.01); *H04L 65/4084* (2013.01); *H04L 65/4092* (2013.01);
     (Continued)

(58) Field of Classification Search
     CPC .. H04N 7/26; H04N 7/12; H04N 7/16; H04N 7/18; G06F 7/06; G06F 17/30
     (Continued)

(56) References Cited

U.S. PATENT DOCUMENTS 6,553,515 B1 *   4/2003   Gross ................. H04L 12/2602
                                                  709/224
8,040,917 B2    10/2011   Ko et al.
(Continued)

FOREIGN PATENT DOCUMENTS

CN        101123730 A     2/2008
CN        101166273 A     4/2008
(Continued)

OTHER PUBLICATIONS

Communication dated Oct. 18, 2011, issued by the International Searching Authority in corresponding International Application No. PCT/KR2011/001113.

(Continued)

*Primary Examiner* — Jay Patel
*Assistant Examiner* — Salame Amr
(74) *Attorney, Agent, or Firm* — Sughrue Mion, PLLC (57) ABSTRACT

A method and apparatus of transmitting video content compressed by a codec to a second device is provided. The method includes: transmitting a codec selection request frame to the second device, the codec selection request frame includes an identifier of at least one codec to be used to compress the video content and requests approval of the use of the at least one codec; receiving a codec selection response frame from the second device, the codec selection response frame includes approval information indicating whether the use of the at least one codec is approved; and transmitting video content compressed by the at least one codec to the second device based on the codec selection response frame.

21 Claims, 11 Drawing Sheets

(51) Int. Cl.
   *H04N 21/2343* (2011.01)
   *H04N 21/239* (2011.01)
   *H04N 21/258* (2011.01)
   *H04L 29/06* (2006.01)
   *H04N 21/6336* (2011.01)
   *H04N 21/6379* (2011.01)

(52) U.S. Cl.
   CPC ....... *H04L 65/607* (2013.01); *H04N 21/2343* (2013.01); *H04N 21/2393* (2013.01); *H04N 21/25825* (2013.01); *H04N 21/25858* (2013.01); *H04N 21/6336* (2013.01); *H04N 21/6379* (2013.01)

(58) Field of Classification Search
   USPC ........... 375/240.13, 240.16, 240.26; 348/159
   See application file for complete search history.

(56) References Cited

U.S. PATENT DOCUMENTS

| | | | |
|---|---|---|---|
| 2002/0023165 A1* | 2/2002 | Lahr | H04L 12/1881 709/231 |
| 2003/0210659 A1* | 11/2003 | Chu | G10L 19/00 370/320 |
| 2004/0107356 A1* | 6/2004 | Shamoon | H04L 63/0428 713/193 |
| 2005/0013462 A1* | 1/2005 | Rhoads | G06F 17/30876 382/100 |
| 2005/0091392 A1 | 4/2005 | Gesswein et al. | |
| 2005/0192052 A1* | 9/2005 | Tenhunen | H04L 29/06027 455/557 |
| 2005/0276570 A1* | 12/2005 | Reed, Jr. | G06F 17/30038 386/231 |
| 2006/0150224 A1* | 7/2006 | Kamariotis | 725/89 |
| 2006/0184783 A1* | 8/2006 | Albert | H04N 19/172 713/100 |
| 2006/0209793 A1* | 9/2006 | Abe | H04L 12/6418 370/352 |
| 2007/0005611 A1* | 1/2007 | Takasugi | G06Q 10/10 |
| 2007/0072638 A1* | 3/2007 | Yang | H04W 52/50 455/522 |
| 2007/0171841 A1* | 7/2007 | Witzel | H04L 29/06027 370/254 |
| 2007/0177015 A1* | 8/2007 | Arakawa et al. | 348/159 |
| 2008/0025414 A1* | 1/2008 | Kim et al. | 375/240.26 |
| 2008/0098450 A1* | 4/2008 | Wu | H04N 21/4312 725/132 |
| 2008/0267290 A1* | 10/2008 | Barbieri et al. | 375/240.13 |
| 2009/0052538 A1 | 2/2009 | Watanabe et al. | |
| 2009/0080381 A1* | 3/2009 | Yashar | H04W 48/20 370/331 |
| 2009/0083279 A1* | 3/2009 | Hasek | 707/10 |
| 2009/0103631 A1* | 4/2009 | Jang | H04N 19/70 375/240.25 |
| 2009/0154556 A1* | 6/2009 | Kim | H04L 65/1083 375/240.02 |
| 2009/0268249 A1* | 10/2009 | Ikeda | G06Q 10/10 358/1.18 |
| 2010/0027678 A1* | 2/2010 | Alfonso | H04N 21/234327 375/240.21 |
| 2010/0050225 A1* | 2/2010 | Bennett | 725/144 |
| 2012/0036048 A1* | 2/2012 | Robb et al. | 705/27.2 |

FOREIGN PATENT DOCUMENTS

| | | |
|---|---|---|
| CN | 101202903 A | 6/2008 |
| JP | 2007-300610 A | 11/2007 |
| JP | 2009-147902 A | 7/2009 |
| KR | 10-2005-0068093 A | 7/2005 |
| KR | 10-2005-0096623 A | 10/2005 |
| KR | 10-0755714 B1 | 9/2007 |
| KR | 10-2009-0061914 A | 6/2009 |
| WO | 2006-019380 A1 | 2/2006 |
| WO | 2007105362 A1 | 9/2007 |
| WO | 2011-071334 A2 | 6/2011 |

OTHER PUBLICATIONS

Communication dated Nov. 22, 2013 issued by the Mexican Institute of Industrial Property in counterpart Mexican Patent Application No. MX/a/2012/008517.

Communication dated Jul. 11, 2013 issued by the Mexican Patent Office in counterpart Mexican Patent Application No. MX/a/2012/008517.

Communication dated Aug. 1, 2013 issued by the Australian Patent Office in counterpart Australian Patent Application No. 2011216642.

Extended European Search Report dated Apr. 17, 2014 in counterpart European Application No. 11744927.2.

Communication, Issued by the Japanese Patent Office, dated Dec. 2, 2014, In counterpart Japanese Application No. 2012-553819.

Communication, Issued by the Indonesian Patent Office, dated Sep. 26, 2014, In counterpart Indonesian Application No. W-00201203772.

Communication dated Jul. 3, 2014 issued by the State Intellectual Property Office of P.R. China in counterpart Chinese Patent Application No. 201180009723.2.

Communication dated Jul. 15, 2014 issued by the Australian IP Government in counterpart Australian Patent Application No. 2011216642.

Communication dated Jul. 31, 2014 issued by the Canadian Intellectual Property Office in counterpart Canadian Application No. 2,790,459.

Communication dated Feb. 12, 2015 by the State Intellectual Property Office of PR China in related Application No. 201180009723.2.

Communication dated Jul. 2, 2015, issued by the Canadian Intellectual Property Office in counterpart Canadian Application No. 2,790,459.

Communication dated Aug. 20, 2015, issued by the State Intellectual Property Office of the People's Republic of China in counterpart Chinese Application No. 201180009723.2.

Communication dated Oct. 6, 2015, issued by the Japanese Patent Office in counterpart Japanese Patent Application No. 2012-553819.

Communication dated Mar. 4, 2016 issued by the State Intellectual Property Office of P.R. China in counterpart Chinese Application No. 201180009723.2.

Communication dated Mar. 30, 2016 issued by the Korean Intellectual Property Office in counterpart Korean Application No. 10-2010-0096516.

Communication dated Sep. 2, 2016, issued by the State Intellectual Property Office of P.R. China in counterpart Chinese Application No. 201180009723.2.

Communication dated Sep. 19, 2016, issued by the Korean Intellectual Property Office in counterpart Korean Application No. 10-2010-0096516.

Communication dated Nov. 3, 2016, issued by the Korean Intellectual Property Office in counterpart Korean Application No. 10-2010-0096516.

Communication dated Jun. 15, 2017 by the State Intellectual Property Office of P.R. China in counterpart Chinese Patent Application No. 201180009723.2.

Communication dated Feb. 27, 2017, issued by the Korean Intellectual Property Office in counterpart Korean Application No. 10-2016-0179679.

\* cited by examiner

| FrameType value | Packet type |
|---|---|
| 0x00 | Uncompressed Video data packet |
| 0x01 | H.264 Compressed Video data packet |
| 0x02 | Vendor Specific Compressed Video data packet |
| | ⋮ |

METHOD AND APPARATUS FOR TRANSMITTING VIDEO CONTENT COMPRESSED BY CODEC

CROSS-REFERENCE TO RELATED PATENT APPLICATIONS

This application claims the benefit of Korean Patent Application No. 10-2010-0096516, filed on Oct. 4, 2010 in the Korean Intellectual Property Office, and U.S. Provisional Application No. 61/306,189, filed on Feb. 19, 2010 in the United States Patent & Trademark Office, the disclosure of which is incorporated herein in its entirety by reference.

BACKGROUND

1. Field

Methods and apparatuses consistent with exemplary embodiments relate to a method and apparatus for transmitting video content compressed by a codec, and more particularly, to a method and apparatus for transmitting video content compressed by using at least one of a plurality of different codecs.

2. Description of the Related Art

Methods of transmitting video content between devices over a wireless network may include transmitting video content in a non-compressed form and transmitting video content compressed by a codec.

When video content is transmitted in a non-compressed form, the video content can be transmitted without any degradation in quality. However, since non-compressed transmission takes a long time, non-compressed transmission cannot be used when the video content is to be reproduced in real time or a bandwidth of a communication link between the devices is small.

As a result, for a small bandwidth communication link or real-time reproduction of video content, the video content is transmitted in a compressed form by compressing the video content using a codec. In this case, however, a receiver that receives the compressed video content needs to be notified about the type of codec used for compressing the video content.

SUMMARY

One or more exemplary embodiments provide a method and apparatus for transmitting video content compressed by at least one of a plurality of different codecs.

According to an aspect of an exemplary embodiment, there is provided a method of transmitting video content compressed by using at least one of a plurality of different codecs to a second device, wherein the transmitting is performed by a first device, the method including: transmitting a codec selection request frame to the second device, the codec selection request frame including an identifier of the at least one codec to be used to compress the video content and requesting approval of the use of the at least one codec; receiving a codec selection response frame from the second device, the codec selection response frame including at least one approval information indicating whether the use of the at least one codec is approved; and transmitting video content compressed by the at least one codec to the second device based on the codec selection response frame.

The method may further include transmitting a capability request frame to the second device, which includes an identifier of at least one codec supported by the first device and requests information about a capability of the second device; and receiving a capability response frame including an identifier of at least one codec supported by the second device from the second device in response to the capability request frame, wherein the identifier of the at least one codec included in the codec selection request frame is generated based on the capability response frame.

The identifier of the at least one codec supported by the first device and the identifier of the at least one codec supported by the second device are included in a combination of an identifier of at least one codec vendor providing the at least one codec and an identifier of at least one codec having a format defined by the at least one codec vendor.

The capability request frame may further include at least one of codec number information indicating the number of codecs supported by the first device, and codec capability information indicating whether the first device supports a video content compression function.

The capability response frame may further include at least one of codec number information indicating the number of codecs supported by the second device, and codec capability information indicating whether the second device supports a video content compression function.

The codec capability information may further include compression type information indicating whether the codec supported by the first device is an H.264 codec or a codec provided by the codec vendor.

The codec selection request frame may further include at least one of a frame identifier indicating that the codec selection request frame is a frame for requesting selection of a codec to be applied to video content to be transmitted by the first device, content number information indicating the amount of video content to be transmitted by the first device, and an identifier of video content to be transmitted by the first device.

The codec selection response frame may further include at least one of a frame identifier indicating that the codec selection response frame is a response frame with respect to the codec selection request frame, content number information indicating the amount of video content to be transmitted to the second device, and an identifier of video content to be transmitted to the second device.

According to an aspect of another exemplary embodiment, there is provided an apparatus for transmitting video content compressed by using at least one of a plurality of different codecs to a second device, the apparatus including: a transmitter that transmits a codec selection request frame to the second device, the codec selection request frame including an identifier of the at least one codec to be used to compress the video content and request approval of the use of the at least one codec; and a receiver that receives a codec selection response frame from the second device, the codec selection response frame including at least one approval information indicating whether the use of the at least one codec is approved, wherein the transmitter transmits video content compressed by the at least one codec to the second device based on the codec selection response frame.

According to an aspect of another exemplary embodiment, there is provided a computer-readable recording medium having embodied thereon a computer program for executing a method of transmitting video content compressed by using at least one of a plurality of different codecs to a second device, the method including transmitting a codec selection request frame to the second device, the codec selection request frame including an identifier that identifies the at least one codec to be used to compress the video content and requests approval of the use of the at least one codec; receiving a codec selection response frame from the second device, the codec selection response frame including at least one approval information indicating whether the use of the at least one codec is approved; and transmitting video content compressed by the at least one codec to the second device based on the codec selection response frame.

BRIEF DESCRIPTION OF THE DRAWINGS

The above and other aspects will become more apparent by describing in detail exemplary embodiments with reference to the attached drawings in which.

DETAILED DESCRIPTION OF THE EXEMPLARY EMBODIMENTS

Hereinafter, exemplary embodiments will be described in detail with reference to the accompanying drawings.

Figure 1:
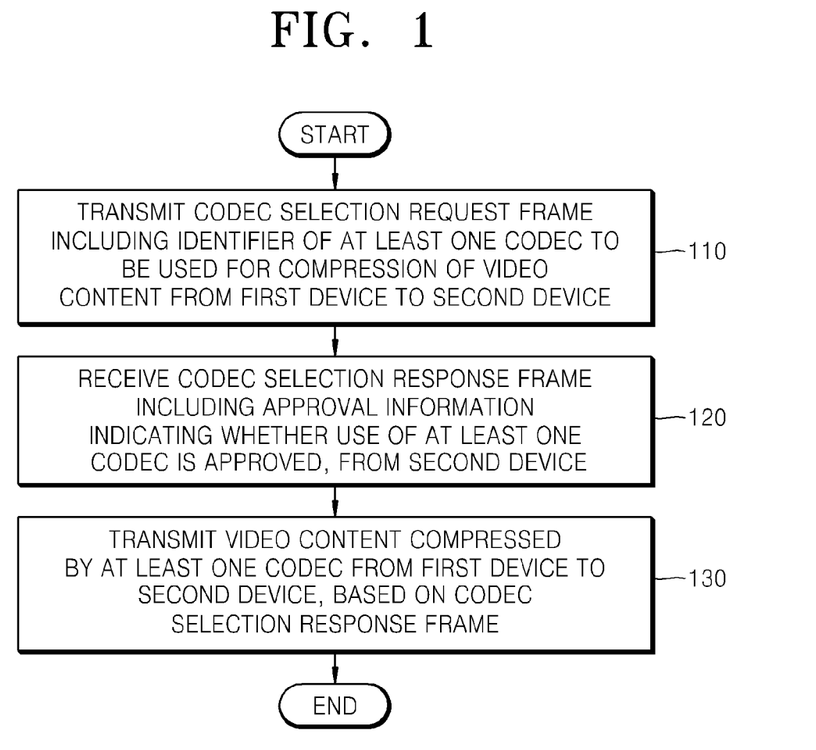
FIG. 1 is a flowchart illustrating a method of transmitting video content, according to an exemplary embodiment.

FIG. 1 is a flowchart illustrating a method of transmitting video content, according to an exemplary embodiment.

In operation 110, a first device transmits a codec selection request frame, which includes an identifier of at least one codec to be used for compressing video content and requests approval to use the at least one codec, to a second device.

The first device includes a device for transmitting the video content, and the second device includes a device for receiving the video content.

A structure of the codec selection request frame according to an exemplary embodiment will be described below with reference to FIGS. 3 and 4.

In operation 120, the first device receives a codec selection response frame, which includes approval information indicating whether the use of the at least one codec is approved, from the second device.

If the codec selection request frame transmitted in operation 110 includes a plurality of codec identifiers, the codec selection response frame may also include a plurality of approval information, each of which may indicate approval or rejection for each of the plurality of codec identifiers.

A structure of the codec selection request frame according to an exemplary embodiment will be described below with reference to FIGS. 6 through 8.

In operation 130, the first device transmits video content compressed by at least one codec to the second device, based on the codec selection response frame.

For example, if approval of the use of a codec A and a codec B for transmitting two pieces of video content, namely, first video content and second video content, is requested through the codec selection request frame, and the use of the codec A and the codec B for the two video contents is approved through the codec selection response frame, the first device compresses the first video content by using the codec A and compresses the second video content by using the codec B, and transmits the compressed first and second video contents.

As such, according to an exemplary embodiment, one codec selection request frame includes an identifier of at least one codec to be used for compression of the video content and one codec selection response frame includes at least one approval information, so that even when the first device transmits a plurality of compressed video contents to the second device, the first device may transmit video contents compressed by a plurality of different codecs by transmitting one codec selection request frame and receiving one codec selection response frame.

Also, the compressed video content is transmitted in the form of a frame, and a structure of the compressed video content frame according to an exemplary embodiment will be described below with reference to FIG. 9.

Figure 2:
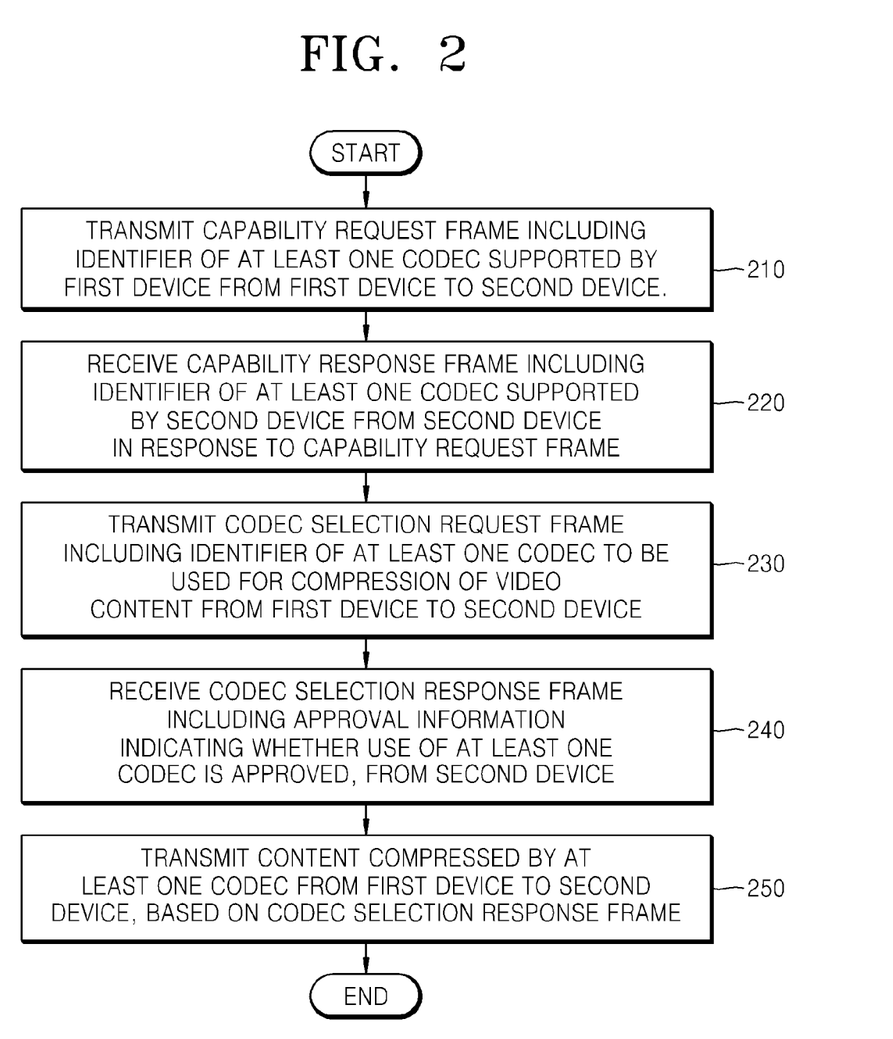
FIG. 2 is a flowchart illustrating a method of transmitting video content, according to another exemplary embodiment.

FIG. 2 is a flowchart illustrating a method of transmitting video content, according to another exemplary embodiment.

In operation 210, the first device transmits a capability request frame, which includes an identifier of at least one codec supported by the first device and requests information about a capability of the second device, to the second device.

If the first device supports a plurality of codecs, a plurality of codec identifiers may be included in the capability request frame and the plurality of codecs may be provided by different codec vendors.

A structure of the capability request frame according to an exemplary embodiment will be described below with reference to FIG. 11.

In operation 220, the first device receives a capability response frame, which includes an identifier of at least one codec supported by the second device, from the second device in response to the capability request frame.

A structure of the capability response frame according to an exemplary embodiment will be described below with reference to FIG. 13.

In operation 230, the first device transmits a codec selection request frame, which includes an identifier of at least one codec to be used for compression of video content and requests approval for the use of the at least one codec, to the second device.

The identifier of the at least one codec included in the codec selection request frame may be generated based on the capability response frame received in operation 220. For example, the identifier of the at least one codec included in the codec selection request frame may include at least one codec supported by the second device based on the capability response frame.

In operation 240, the first device receives a codec selection response frame, which includes approval information indicating whether the use of the at least one codec is approved, from the second device.

In operation 250, the first device transmits content compressed by at least one codec to the second device, based on the codec selection response frame.

Figure 3:
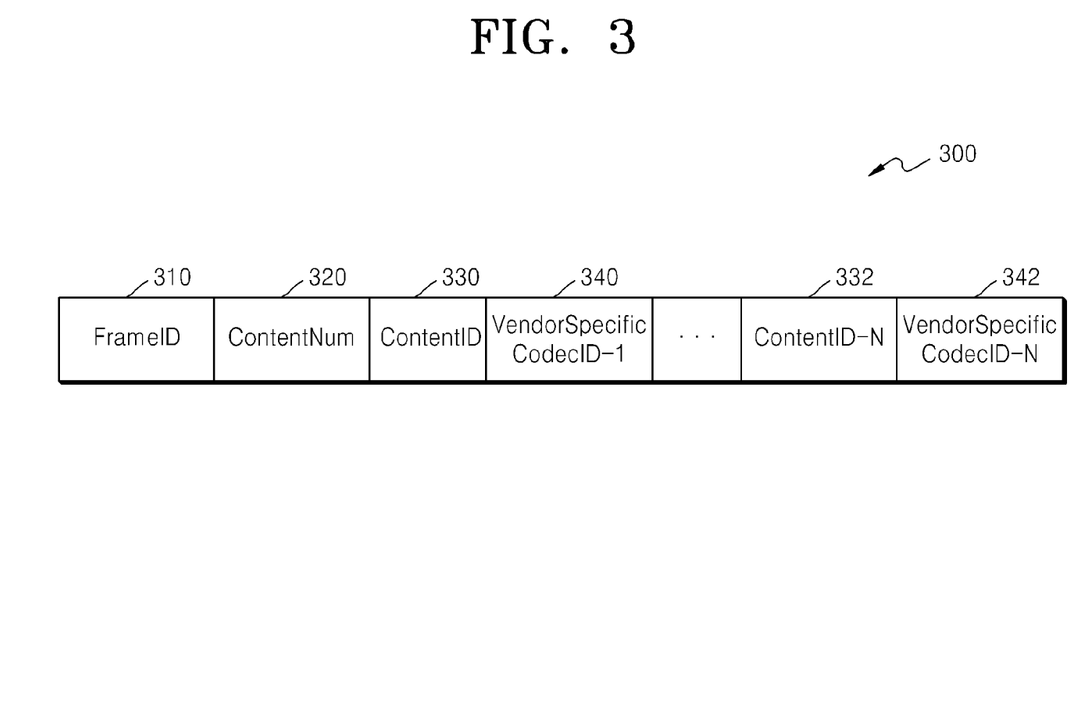
FIG. 3 is a diagram showing a structure of a codec selection request frame according to an exemplary embodiment.

FIG. 3 is a diagram for describing a structure of a codec selection request frame 300 according to an exemplary embodiment.

Referring to FIG. 3, the codec selection request frame 300 may include a frame identifier field 310, a content number field 320, content identifier fields 330 through 332, and vendor codec identifier fields 340 through 342.

The frame identifier field 310 indicates that the codec selection request frame 300 is a frame for requesting selection of a codec to be applied to video content to be transmitted by the first device.

The content number field 320 indicates the amount of video content to be transmitted by the first device.

The content identifier fields 330 through 332 indicate identifiers of video content to be transmitted by the first device. In FIG. 3, N content identifier fields 330 through 332 corresponding to N video contents are shown.

The vendor codec identifier fields 340 through 342 indicate identifiers of codecs to be used for compression of video content to be transmitted by the first device. In FIG. 3, N vendor codec identifier fields 340 through 342 corresponding to N codecs are shown. The N codec vendor identifier fields 340 through 342 may include identifiers of N different types of codecs.

Figure 4:
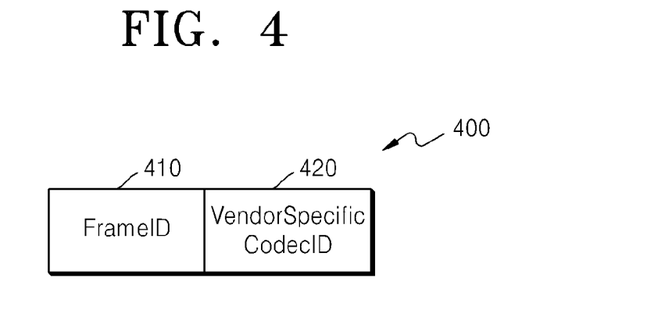
FIG. 4 is a diagram showing a structure of a codec selection request frame according to another exemplary embodiment.

FIG. 4 is a diagram showing a structure of a codec selection request frame 400 according to another exemplary embodiment.

Referring to FIG. 4, the codec selection request frame 400 may include a frame identifier field 410 and a vendor codec identifier field 420.

The frame identifier field 410 indicates that the codec selection request frame 400 is a frame for requesting selection of a codec to be applied to video content to be transmitted by the first device.

The vendor codec identifier field 420 indicates an identifier of a codec to be used for compression of video content to be transmitted by the first device.

For example, when the codec selection request frame 400 includes the single vendor codec identifier field 420, all video content following transmission of the codec selection request frame 400 are to be compressed by the codec corresponding to the identifier recorded in the vendor codec identifier field 420 and then transmitted.

The identifier of the codec recorded in the vendor codec identifier field 420 may have a format defined by a codec vendor.

Hereinafter, a structure of the vendor codec identifier field 420 according to an exemplary embodiment will be described with reference to FIG. 5.

Figure 5:
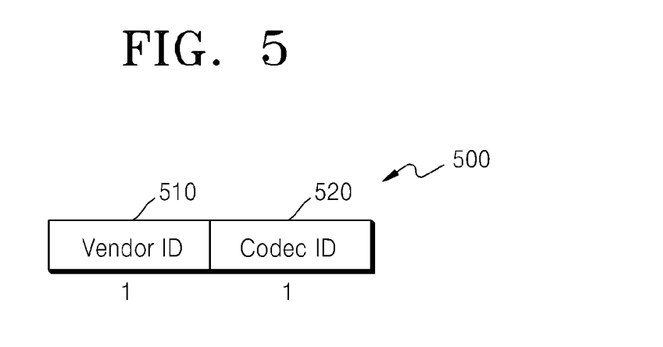
FIG. 5 is a diagram showing a structure of a vendor codec identifier field according to an exemplary embodiment.

FIG. 5 is a diagram for describing a structure of a vendor codec identifier field 500 according to an exemplary embodiment.

Referring to FIG. 5, the vendor codec identifier field 500 according to the exemplary embodiment includes a vendor identifier field 510 and a codec identifier field 520.

The vendor identifier field 510 indicates an identifier of a codec vendor providing a codec.

The codec identifier field 520 indicates an identifier of a codec having a format defined by the codec vendor.

Figure 6:
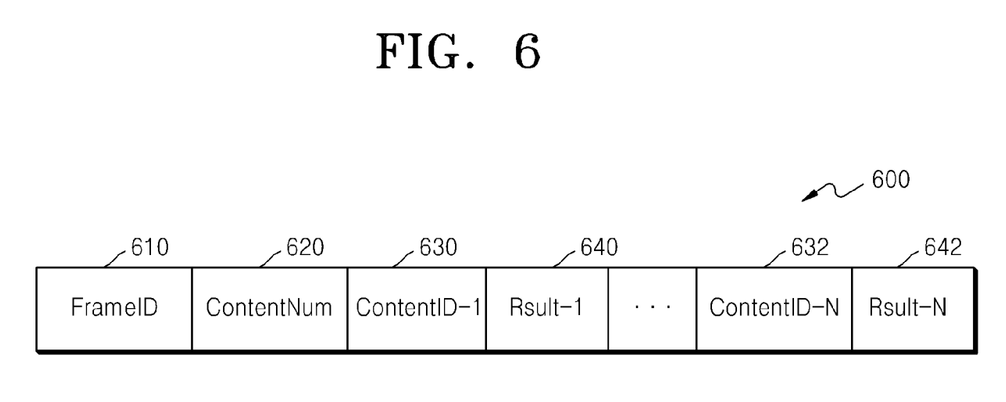
FIG. 6 is a diagram showing a structure of a codec selection response frame according to an exemplary embodiment.

FIG. 6 is a diagram for describing a structure of a codec selection response frame 600 according to an exemplary embodiment.

Referring to FIG. 6, the codec selection response frame 600 may include a frame identifier field 610, a content number field 620, content identifier fields 630 through 632, and approval information fields 640 through 642.

The frame identifier field 610 indicates that the codec selection response frame 600 is a response frame with respect to the codec selection request frame 300.

The content number field 620 indicates the number of video contents to be received by the second device.

The content identifier fields 630 through 632 indicate identifiers of video contents to be received by the second device.

The approval information fields 640 through 642 indicate approval information regarding the use of codecs corresponding to the identifiers of the codecs included in the codec selection request frame 300. Some of the approval information fields 640 through 642 may indicate information approving the use of the codecs corresponding to the identifiers of the codecs included in the codec selection request frame 300, and some of the approval information fields 640 through 642 may indicate information rejecting the use of the codecs corresponding to the identifiers of the codecs included in the codec selection request frame 300.

Figure 7:
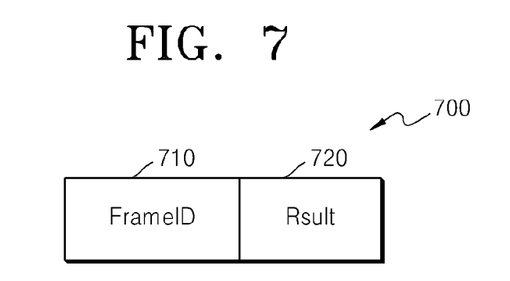
FIG. 7 is a diagram showing a structure of a codec selection response frame according to another exemplary embodiment.

FIG. 7 is a diagram for describing a structure of a codec selection response frame 400 according to another exemplary embodiment.

Referring to FIG. 7, the codec selection response frame 700 may include a frame identifier field 710 and an approval information field 720.

The frame identifier field 710 indicates that the codec selection response frame 700 is a response frame with respect to the codec selection request frame 300.

The approval information field 720 indicates approval information regarding the use of at least one codec corresponding to the identifier of the at least one codec included in the codec selection request frame 300. In other words, the approval information field 720 shown in FIG. 7 may indicate whether the use of all codecs corresponding to identifiers of all the codecs included in the codec selection request frame 300 is approved.

Figure 8:
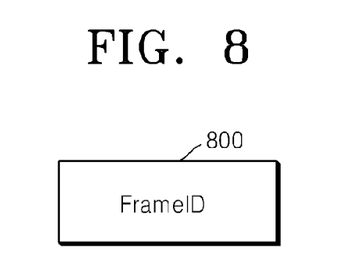
FIG. 8 is a diagram showing a structure of a codec selection response frame according to another exemplary embodiment.

FIG. 8 is a diagram for describing a structure of a codec selection response frame 800 according to another exemplary embodiment.

Referring to FIG. 8, the codec selection response frame includes only a frame identifier field 800.

In FIG. 8, the frame identifier field 800 indicates that the codec selection response frame is a response frame with respect to the codec selection request frame 300. If the first device receives the codec selection response frame including only the frame identifier field 800, the first device may determine that the use of all codecs corresponding to identifiers of all the codecs included in the codec selection request frame 300 corresponding to the codec selection response frame is approved.

Figure 9:
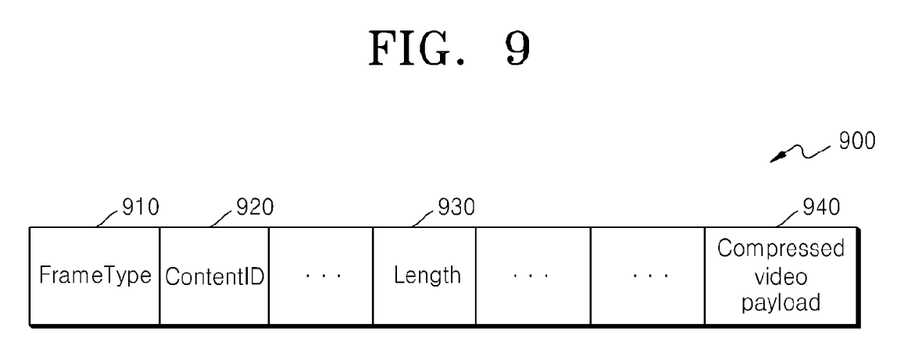
FIG. 9 is a diagram showing a structure of a compressed video content frame according to an exemplary embodiment.

FIG. 9 is a diagram for describing a structure of a compressed video content frame 900 according to an exemplary embodiment.

Referring to FIG. 9, the compressed video content frame 900 includes a frame type field 910, a content identifier field 920, a length field 930, and a compression video payload field 940.

The frame type field 910 indicates that a type of the compressed video content frame 900 is a compressed video content type.

Values of the frame type field 910 will be described below with reference to FIG. 10.

The content identifier field 920 indicates a content identifier of the video content included in the video content frame 900.

The length field 930 indicates the length of the video content frame 900.

The compression video payload field 940 includes the video content compressed by a predetermined codec.

Figure 10:
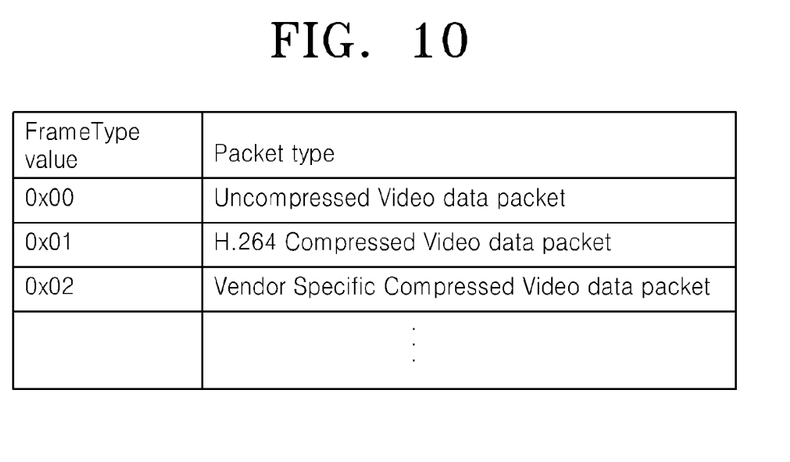
FIG. 10 is a diagram showing a frame type field according to an exemplary embodiment.

FIG. 10 is a diagram showing the frame type field 910 according to an exemplary embodiment.

Referring to FIG. 10, when the frame type field 910 has a value of 0x00, it means that a frame including the frame type field 910 is a non-compressed video data frame; when the frame type field 910 has a value of 0x01, it means that the frame including the frame type field 910 is a video data frame compressed by an H.264 codec; and when the frame type field 910 has a value of 0x02, it means that the frame including the frame type field 910 is a video frame compressed by a codec designated by a codec vendor.

Figure 11:
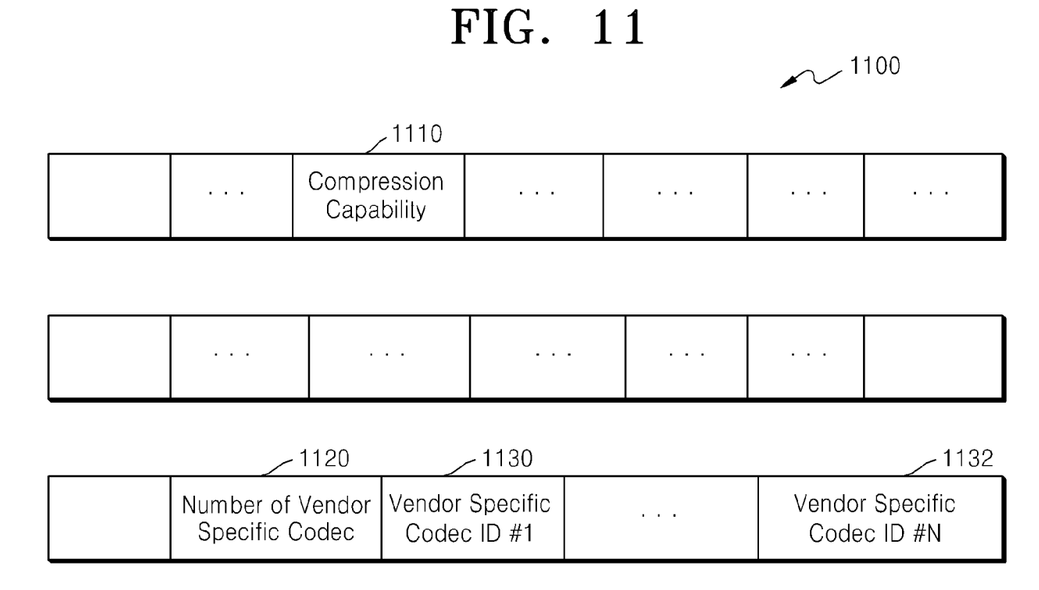
FIG. 11 is a diagram showing a structure of a capability request frame according to an exemplary embodiment.

FIG. 11 is a diagram showing a structure of a capability request frame 1100 according to an exemplary embodiment.

Referring to FIG. 11, the capability request frame 1100 may include a codec capability field 1110, a vendor codec number field 1120, and vendor codec identifier fields 1130 through 1132.

The codec capability field 1110 indicates whether the first device supports a video content compression capability. Here, the codec capability field 1110 may further include a compression type field (not shown) indicating a compression type, which will be described below with reference to FIG. 12.

The vendor codec number field 1120 indicates the number of codecs supported by the first device.

The vendor codec identifier fields 1130 through 1132 indicate an identifier of at least one codec supported by the first device. In FIG. 11, N vendor codec identifier fields 1130 through 1132 corresponding to N codecs are shown.

Figure 12:
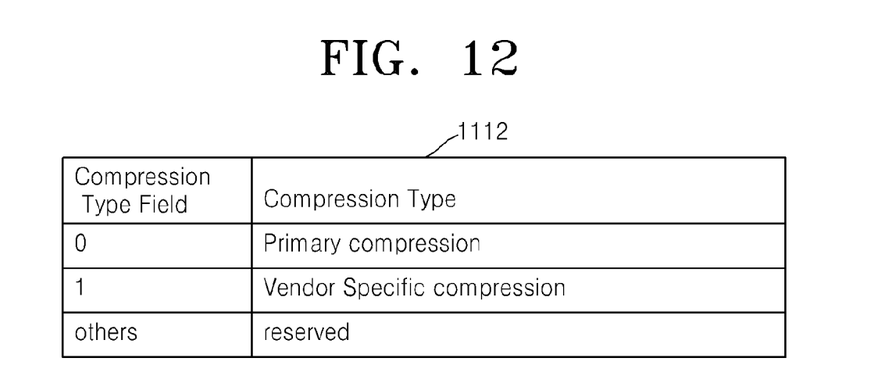
FIG. 12 is a diagram showing a compression type field according to an exemplary embodiment.

FIG. 12 is a diagram for describing a compression type field 1112 according to an embodiment of the present invention.

Referring to FIG. 12, the compression type field 1112 indicates that when the compression type field 1112 has a value of 0, it means that video content is compressed by using a first compression technique; and when the compression type field 1112 has a value of 1, it means that a video content is compressed by using a compression technique designated by a vendor. Here, for example, the first compression technique may be an H.264 technique.

Figure 13:
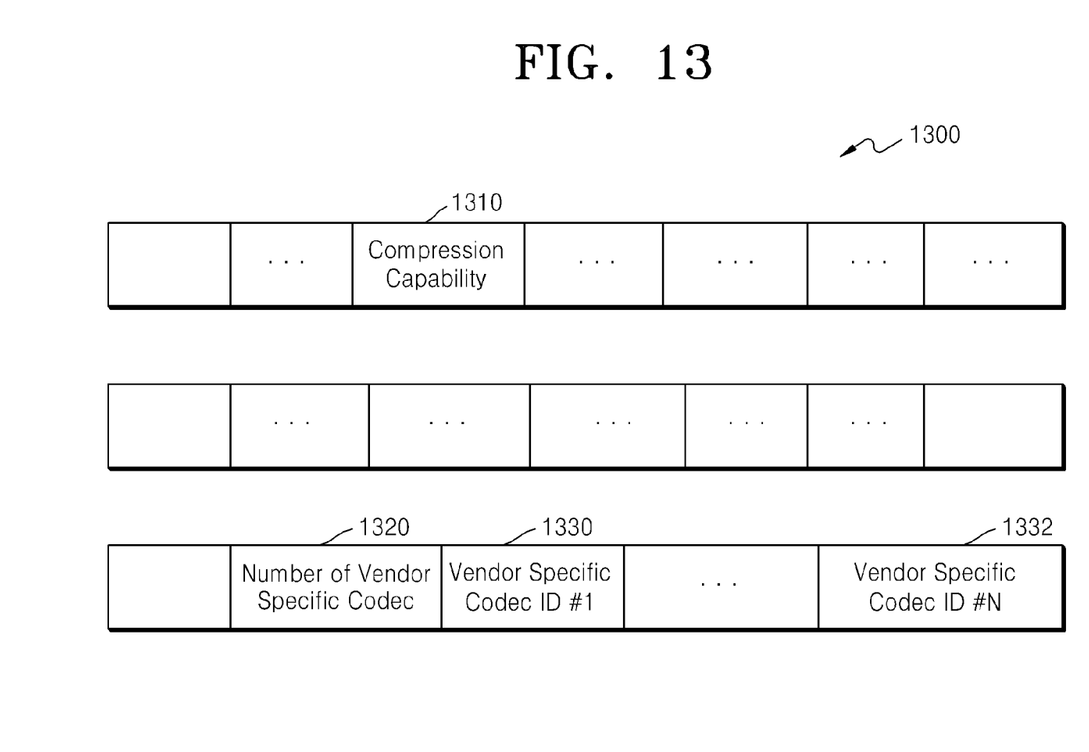
FIG. 13 is a diagram showing a structure of a capability response frame according to an exemplary embodiment.

FIG. 13 is a diagram showing a structure of a capability response frame 1300 according to an exemplary embodiment.

Referring to FIG. 13, the capability response frame 1300 may include a codec capability field 1310, a vendor codec number field 1320, and vendor codec identifier fields 1330 through 1332. The capability response frame 1300 has the same structure as the capability request frame 1100 shown in FIG. 11.

The codec capability field 1310 indicates whether the second device supports a video content compression capability.

The vendor codec number field 1320 indicates the number of codecs supported by the second device.

The vendor codec identifier fields 1330 through 1332 indicate an identifier of at least one codec supported by the second device. In FIG. 13, N vendor codec identifier fields 1330 through 1332 corresponding to N codecs are shown.

Figure 14:
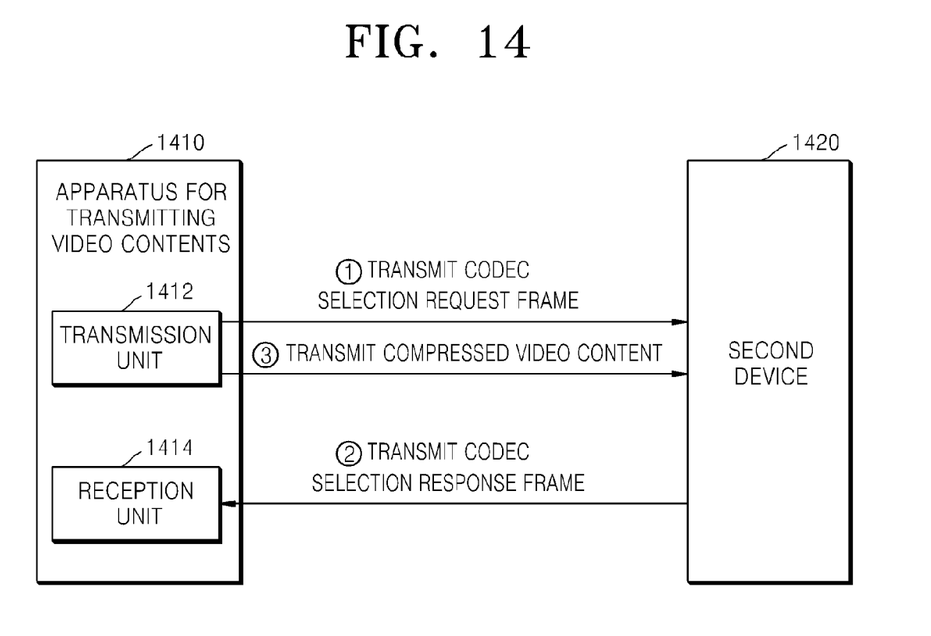
FIG. 14 is a block diagram of an apparatus for transmitting video contents, according to an exemplary embodiment.

FIG. 14 is a block diagram of an apparatus 1410 for transmitting video contents, according to an exemplary embodiment.

Referring to FIG. 14, the apparatus 1410 may include a transmission unit 1412 and a reception unit 1414. In an exemplary embodiment, the apparatus 1410 is mounted on a first device (not shown). However, in another exemplary embodiment, the apparatus 1410 may be the first device. For convenience of explanation, a second device 1420 is further shown in FIG. 14.

The transmission unit 1412 transmits a codec selection request frame, including an identifier of at least one codec to be used for compression of video content, to the second device 1420.

The reception unit 1414 receives a codec selection response frame, including at least one approval information indicating whether the use of the at least one codec is approved, from the second device 1420.

The transmission unit 1412, upon receiving the codec selection response frame, transmits video content compressed by at least one codec to the second device 1420, based on the codec selection response frame.

As described above, the transmission unit 1412 may further transmit a capability request frame, which includes an identifier of at least one codec supported by the first device and requests information about a capability of the second device 1420, to the second device 1420. The reception unit 1414 may further receive a capability response frame, which includes an identifier of at least one codec supported by the second device 1420 in response to the capability request frame, from the second device 1420.

The transmission unit 1412 may further transmit first device capability information to the second device 1420, and the reception unit 1414 may further receive the identifier of the at least one codec supported by the second device from the second device 1420.

The methods according to the exemplary embodiments above can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion.

While exemplary embodiments have been particularly shown and described, it will be understood by one of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the inventive concept is defined not by the detailed description but by the appended claims, and all differences within the scope will be construed as being included in the claims.

What is claimed is:

1. A method of transmitting media content by a first device, the method comprising:
    receiving, from a second device, a capability response frame comprising a first identifier that identifies at least one codec supported by the second device;
    transmitting, from the first device, a codec selection request frame to the second device, the codec selection request frame comprising a second identifier that identifies a plurality of codecs to be used to compress at least one media content;
    receiving, at the first device, a codec selection response frame from the second device, the codec selection response frame comprising approval information indicating whether use of at least one codec of the plurality of codecs is approved; and
    transmitting, from the first device, the at least one media content compressed by the plurality of codecs to the second device based on the codec selection response frame,
    wherein the codec selection request frame further comprises at least one content identifier indicating media content to be transmitted by the first device and content number information indicating an amount of media content to be transmitted by the first device.

2. The method of claim 1, further comprising:
    transmitting a capability request frame to the second device, wherein the capability response frame is received in response to the capability request frame.

3. The method of claim 2, wherein the first identifier comprises at least one of a third identifier of at least one codec vendor providing the at least one codec and a fourth identifier of at least one codec having a format defined by the at least one codec vendor.

4. The method of claim 1, wherein the capability response frame further comprises codec number information indicating a number of codecs supported by the second device.

5. The method of claim 2, wherein the capability request frame requests information about a capability of the second device.

6. The method of claim 1, wherein the codec selection request frame further comprises at least one of a frame identifier indicating that the codec selection request frame is a frame for requesting selection of a codec to be applied to the media content to be transmitted by the first device.

7. The method of claim 1, wherein the codec selection response frame further comprises at least one of a frame identifier indicating that the codec selection response frame is a response frame with respect to the codec selection request frame.

8. The method of claim 1, wherein the second identifier identifies a first codec and a second codec to be used to compress the media content.

9. The method of claim 8, wherein the approval information comprises a first approval information field that indicates approval or rejection of the first codec, and a second approval information field that indicates approval or rejection of the second codec.

10. The method of claim 8, wherein the approval information comprises an approval information field that indicates approval or rejection of the first codec and the second codec.

11. An apparatus that transmits media content, the apparatus comprising:
    a receiver configured to receive, from an second device, a capability response frame comprising a first identifier that identifies at least one codec supported by the second device; and
    a transmitter configured to transmit a codec selection request frame to the second device, the codec selection request frame comprising a second identifier that identifies a plurality of codecs to be used to compress at least one media content,
    wherein the receiver is further configured to receive a codec selection response frame from the second device, the codec selection response frame comprising approval information indicating whether use of at least one codec of the plurality of codecs is approved,
    wherein the transmitter is further configured to transmit the at least one media content compressed by the plurality of codecs to the second device based on the codec selection response frame, and
    wherein the codec selection request frame further comprises at least one content identifier indicating the at least one media content to be transmitted by the apparatus and content number information indicating an amount of the at least one media content to be transmitted by the apparatus.

12. The apparatus of claim 11, wherein the transmitter is further configured to transmit a capability request frame to the second device, and wherein the capability response frame is received in response to the capability request frame.

13. The apparatus of claim 12, wherein the first identifier comprises at least one of a third identifier of at least one codec vendor providing the at least one codec and a fourth identifier of at least one codec having a format defined by the at least one codec vendor.

14. The apparatus of claim 11, wherein the capability response frame further comprises information indicating a number of codecs supported by the second device.

15. The apparatus of claim 12, wherein the capability request frame requests information about a capability of the second device.

16. The apparatus of claim 11, wherein the codec selection request frame further comprises at least one of a frame identifier indicating that the codec selection request frame is a frame for requesting selection of a codec to be applied to the at least one media content to be transmitted by the apparatus.

17. The apparatus of claim 11, wherein the codec selection response frame further comprises at least one of a frame identifier indicating that the codec selection response frame is a response frame with respect to the codec selection request frame.

18. The apparatus of claim 11, wherein the second identifier identifies a first codec and a second codec to be used to compress the at least one media content.

19. The apparatus of claim 18, wherein the approval information comprises a first approval information field that indicates approval or rejection of the first codec, and a second approval information field that indicates approval or rejection of the second codec.

20. The apparatus of claim 18, wherein the approval information comprises an approval information field that indicates approval or rejection of the first codec and the second codec.

21. A non-transitory computer-readable recording medium having embodied thereon a computer program, which when executed by a computer, performs a method comprising:

receiving, by a first device, a capability response frame from a second device, the capability response frame comprising a first identifier that identifies at least one codec supported by the second device;

transmitting, from the first device, a codec selection request frame to the second device, the codec selection request frame comprising a second identifier that identifies a plurality of codecs to be used to compress at least one media content;

receiving, at the first device, a codec selection response frame from the second device, the codec selection response frame comprising approval information indicating whether use of the at least one codec of the plurality of codecs is approved; and transmitting, from the first device, the at least one media content compressed by the plurality of codecs to the second device based on the codec selection response frame, wherein the codec selection request frame further comprises at least one content identifier indicating media content to be transmitted by the first device and content number information indicating an amount of media content to be transmitted by the first device.

* * * * *